(12) United States Patent
Lei

(10) Patent No.: US 12,424,098 B2
(45) Date of Patent: Sep. 23, 2025

(54) DRIVING ASSISTANCE PROCESSING METHOD AND APPARATUS, COMPUTER-READABLE MEDIUM, AND ELECTRONIC DEVICE

(71) Applicant: Tencent Technology (Shenzhen) Company Limited, Guangdong (CN)

(72) Inventor: Yixue Lei, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 84 days.

(21) Appl. No.: 17/989,273

(22) Filed: Nov. 17, 2022

(65) Prior Publication Data

US 2023/0078241 A1 Mar. 16, 2023

Related U.S. Application Data

(63) Continuation of application No. PCT/CN2021/138765, filed on Dec. 16, 2021.

(30) Foreign Application Priority Data

Apr. 30, 2021 (CN) .......................... 202110484547.3

(51) Int. Cl.
*G08G 1/16* (2006.01)
(52) U.S. Cl.
CPC .................. *G08G 1/161* (2013.01)
(58) Field of Classification Search
CPC .... G08G 1/161; G08G 1/0112; G08G 1/0133; G08G 1/0141; G08G 1/096775;
(Continued)

(56) References Cited

U.S. PATENT DOCUMENTS 10,235,882 B1 * 3/2019 Aoude .................... G06N 5/046
2014/0095061 A1 * 4/2014 Hyde ...................... G01S 17/86
701/300
(Continued)

FOREIGN PATENT DOCUMENTS

| CN | 110936960 A | * | 3/2020 | ............ B60W 40/06 |
| CN | 112258838 A | | 1/2021 | |
| CN | 113066289 A | | 7/2021 | |

OTHER PUBLICATIONS

International Search Report issued Mar. 15, 2022 in Application No. PCT/CN2021/138765.(17 pages).

*Primary Examiner* — James J Yang
(74) *Attorney, Agent, or Firm* — ArentFox Schiff LLP

(57) ABSTRACT

A driving assistance processing method is provided. In the method, location information and traveling status information of a plurality of vehicle terminals are obtained. A forward collision warning (FCW) message is generated in response to detecting that a specified vehicle terminal of the plurality of vehicle terminals has a potential collision risk. The potential collision risk is detected based on the location information of at least the specified vehicle terminal and the traveling status information of at least the specified vehicle terminal. A transmission mode of the FCW message is determined based on communication capabilities of the plurality of vehicle terminals included in an FCW vehicle set of the specified vehicle terminal. The FCW message is transmitted to the plurality of vehicle terminals included in the FCW vehicle set in the determined transmission mode. Apparatus and non-transitory computer-readable storage medium counterpart embodiments are also contemplated.

20 Claims, 4 Drawing Sheets

(58) Field of Classification Search
CPC ...... G08G 1/164; G08G 1/0104; H04L 67/12; H04L 67/303; H04L 67/52
See application file for complete search history.

(56) References Cited

U.S. PATENT DOCUMENTS

2020/0108869 A1* 4/2020 You .................. H04W 4/46
2020/0120064 A1* 4/2020 Cho .................. H04L 61/5007
2020/0168080 A1* 5/2020 Kim .................. G08G 1/164

* cited by examiner

DRIVING ASSISTANCE PROCESSING METHOD AND APPARATUS, COMPUTER-READABLE MEDIUM, AND ELECTRONIC DEVICE

RELATED APPLICATIONS

The present application is a continuation of International Application No. PCT/CN2021/138765, entitled "DRIVING ASSISTANCE PROCESSING METHOD AND APPARATUS, COMPUTER-READABLE MEDIUM, AND ELECTRONIC DEVICE" and filed on Dec. 16, 2021, which claims priority to Chinese Patent Application No. 202110484547.3, entitled "DRIVING ASSISTANCE PROCESSING METHOD AND APPARATUS, COMPUTER-READABLE MEDIUM, AND ELECTRONIC DEVICE" and filed on Apr. 30, 2021. The entire disclosures for the prior applications are hereby incorporated by reference in their entirety.

FIELD OF THE TECHNOLOGY

This application relates to the field of computer and communication technologies, including to a driving assistance processing method and apparatus, a computer-readable medium, and an electronic device.

BACKGROUND OF THE DISCLOSURE

An advanced driving assistance system (ADAS) senses a surrounding environment in real time by using various sensors (such as millimeter-wave radar, LIDAR, monocular or binocular camera and satellite navigation, and the like) installed on a vehicle in a driving process of the vehicle, collects data, identifies, detects, and tracks stationary and moving objects, and performs system operation and analysis in combination with navigation map data, to enable a driver to recognize potential hazards in advance, thereby effectively increasing the comfort and safety of car driving.

However, sensing range of ADAS may be limited, and a more effective collaboration mechanism between multiple vehicles is lacking when a driving safety risk arises. Therefore, there are limitations in terms of safety.

SUMMARY

Embodiments of this disclosure provide a driving assistance processing method and apparatus, a non-transitory computer-readable storage medium, and an electronic device, to improve the safety of an ADAS at least to some extent.

Other characteristics and advantages of this disclosure become apparent from the following detailed description, or may be recognized in part through the practice of this disclosure.

According to an aspect of the embodiments of this disclosure, a driving assistance processing method is provided. In the method, location information and traveling status information of a plurality of vehicle terminals are obtained. A forward collision warning (FCW) message is generated in response to detecting that a specified vehicle terminal of the plurality of vehicle terminals has a potential collision risk. The potential collision risk is detected based on the location information of at least the specified vehicle terminal and the traveling status information of at least the specified vehicle terminal. A transmission mode of the FCW message is determined based on communication capabilities of the plurality of vehicle terminals included in an FCW vehicle set of the specified vehicle terminal. The FCW message is transmitted to the plurality of vehicle terminals included in the FCW vehicle set in the determined transmission mode.

According to an aspect of the embodiments of this disclosure, a driving assistance processing apparatus is provided. The driving assistance processing apparatus includes processing circuitry that is configured to obtain location information and traveling status information of a plurality of vehicle terminals. The processing circuitry is configured to generate a forward collision warning (FCW) message in response to detection that a specified vehicle terminal of the plurality of vehicle terminals has a potential collision risk. The potential collision risk is detected based on the location information of at least the specified vehicle terminal and the traveling status information of at least the specified vehicle terminal. The processing circuitry is configured to determine a transmission mode of the FCW message based on communication capabilities of the plurality of vehicle terminals included in an FCW vehicle set of the specified vehicle terminal. Further, the processing circuitry is configured to transmit the FCW message to the plurality of vehicle terminals included in the FCW vehicle set in the determined transmission mode.

According to an aspect of the embodiments of this disclosure, a non-transitory computer-readable medium is provided, storing instructions which when executed by a processor cause the processor to perform the driving assistance processing method according to the foregoing embodiment.

According to an aspect of the embodiments of this disclosure, an electronic device is provided, including: one or more processors; and a storage apparatus, configured to store one or more programs, the one or more programs, when executed by the one or more processors, causing the one or more processors to implement the driving assistance processing method according to the foregoing embodiment.

According to an aspect of the embodiments of this disclosure, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, to cause the computer device to perform the driving assistance processing method provided in the foregoing embodiments.

It is to be understood that the above general descriptions and the following detailed descriptions are merely for exemplary and explanatory purposes, and do not limit the scope of this disclosure.

BRIEF DESCRIPTION OF THE DRAWINGS

The accompanying drawings herein, which are incorporated into the specification and constitute a part of this specification, show embodiments that conform to this disclosure, and are used for describing a principle of this disclosure together with this specification. The accompanying drawings in the following description show merely some embodiments of this disclosure. Other embodiments are within the scope of the present disclosure. In the accompanying drawings.

DESCRIPTION OF EMBODIMENTS

Now, exemplary implementations are described with reference to the accompanying drawings. However, the exemplary implementations may be implemented in various forms, and are not to be understood as being limited to the examples described herein.

In addition, the described features, structures, or characteristics may be combined in one or more embodiments in any appropriate manner. In the following descriptions, specific details are provided to give a full understanding of the embodiments of this disclosure. However, a person skilled in the art is to be aware that, the technical solutions in this disclosure may be implemented without one or more of the particular details, or other methods, unit, apparatus, or step may be adopted. In other cases, well-known methods, apparatuses, implementations, or operations may not be shown or described in detail, to avoid obscuring the aspects of this disclosure.

The block diagrams shown in the accompanying drawings are merely functional examples and do not necessarily correspond to a physically independent entity. To be specific, such functional entities may be implemented in the form of software, or implemented in one or more hardware modules or integrated circuits, or implemented in different networks and/or processor apparatuses and/or microcontroller apparatuses.

The flowcharts shown in the accompanying drawings are merely examples for descriptions, do not necessarily include all content and operations/steps, and are not necessarily performed in the described orders. For example, some operations/steps may be further divided, while some operations/steps may be combined or partially combined. Therefore, an actual execution order may vary depending on an actual situation.

"Plurality of" mentioned in the specification means two or more. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
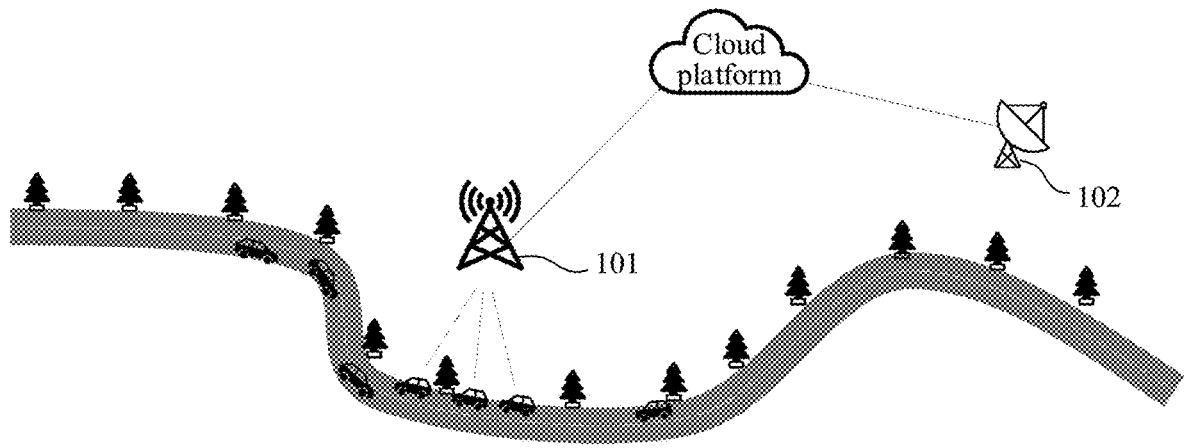
FIG. 1 is a schematic diagram of an application scenario according to an embodiment of this disclosure.

FIG. 1 is a schematic diagram of an application scenario according to an embodiment of this disclosure.

As shown in FIG. 1, in an application scenario of this disclosure, a vehicle terminal may communicate with a cloud platform through a base station 101. The cloud platform may intercommunicate with a high-precision positioning system 102 and implement high-precision positioning of the vehicle terminal by collaborating with the vehicle terminal. The base station 101 may be a 5G base station or may be a 3G or 4G base station or may be a next-generation mobile communication base station. The cloud platform may be a road-side cloud platform or a central cloud platform. The road-side cloud platform is a cloud platform disposed near a road and is only configured to serve a few road sections. With respect to the road-side cloud platform, the central cloud platform is a cloud platform that serves many road sections or all road sections. The service area of the central cloud platform is much larger than that of the road-side cloud platform. The central cloud platform may be disposed at a back end of a core network.

A vehicle terminal may interact with the cloud platform (including the central cloud platform and the road-side cloud platform) through the base station 101 (that is, a mobile communication network) as shown in FIG. 1, and may further interact with the road-side cloud platform through vehicle-to-everything (V2X) communication.

In an embodiment of this disclosure, the vehicle terminal shown in FIG. 1 may be provided with an ADAS function. The ADAS function specifically includes a warning system and a control system. The warning system includes an FCW system, a lane departure warning (LDW) system, a blind spot detection (BSD) system, a driver fatigue warning (DFW) system, a tire pressure monitoring system (TPMS), and/or the like. The control system includes a lane keeping assist (LKA) system, an automated parking system (APS), an autonomous emergency braking (AEB) system, an adaptive cruise control (ACC) system, a pedestrian protection system (PPS), a down-hill assist control (DAC) system, and/or the like. In some embodiments of this disclosure, not all vehicles have the ADAS function. A vehicle with the ADAS function does not necessarily have all the foregoing functions, and may have only part of the ADAS function.

To resolve the problem of a limited sensing range of an ADAS, in an embodiment of this disclosure, a vehicle terminal may report location information and traveling status information of the vehicle terminal and road condition information of a road section on which the vehicle terminal travels to a cloud platform (for example, the cloud platform shown in FIG. 1). Next, the cloud platform combines location information and traveling status information of a plurality of vehicle terminals and road condition information to detect whether a vehicle has a potential collision risk, generates an FCW message in response to detecting that a specified vehicle terminal has a potential collision risk, then determines a transmission mode of the FCW message according to communication capabilities (for example, whether the vehicle terminals support a mobile communication network and whether the vehicle terminals support PC5 transmission) of vehicle terminals included in an FCW vehicle set corresponding to the specified vehicle terminal, and then transmits the FCW message to the vehicle terminals included in the FCW vehicle set in the determined transmission mode.

In an embodiment of this disclosure, the cloud platform may determine whether a vehicle has a potential collision risk depending on an artificial intelligence (AI) technology. The AI technology is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science. This technology attempts to understand the essence of intelligence and produce a new intelligent machine that can react in a manner similar to human intelligence. AI is to study the design principles and implementation methods of various intelligent machines, so that the machines can perceive, infer, and make decisions.

In addition, the AI technology is a comprehensive subject, relating to a wide range of fields, and involving both hardware and software techniques. Basic AI technologies generally include technologies such as a sensor, a dedicated AI chip, cloud computing, distributed storage, a big data processing technology, an operating/interaction system, and electromechanical integration. An AI software technology mainly includes fields such as a computer vision (CV) technology, a speech processing technology, a natural language processing technology, and machine learning/deep learning (DL).

CV is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, the CV studies related theories and technologies and attempts to establish an AI system that can obtain information from images or multi-dimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biometric feature recognition technologies such as common face recognition and fingerprint recognition.

In combination with this disclosure, both the vehicle terminals and the cloud platform can use technologies such as computer vision and machine learning in the AI technology to improve the accuracy of driving assistance. The vehicle terminals can also implement autonomous driving based on this.

The implementation details of the technical solutions in the embodiments of this disclosure are described below in detail.

Figure 2:
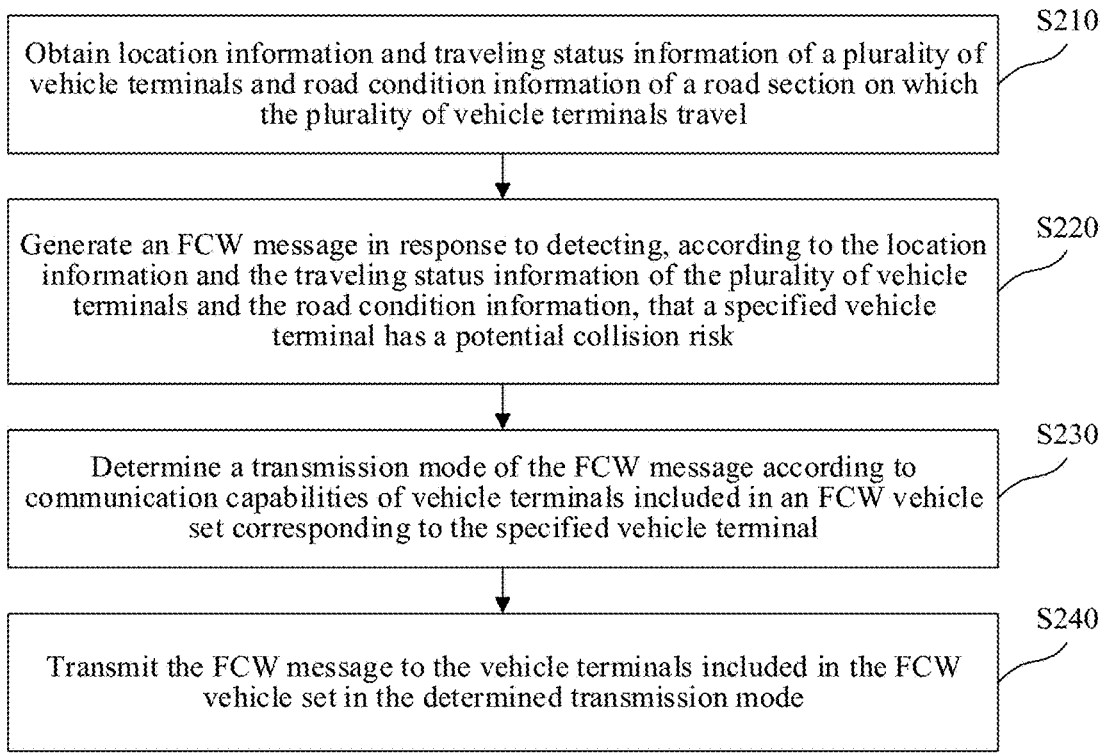
FIG. 2 is a flowchart of a driving assistance processing method according to an embodiment of this disclosure.

FIG. 2 is a flowchart of a driving assistance processing method according to an embodiment of this disclosure. The driving assistance processing method may be performed by a cloud platform, where the cloud platform may be a central cloud platform or a road-side cloud platform, or performed by the driving assistance processing apparatus shown in FIG. 6, or performed by the electronic device shown in FIG. 7. Referring to FIG. 2, the driving assistance processing method includes at least steps S210 to S230, which are described below in further detail:

In step S210, location information and traveling status information of a plurality of vehicle terminals and road condition information of a road section on which the plurality of vehicle terminals travel are obtained. In an example, location information and traveling status information of a plurality of vehicle terminals are obtained. In some examples, road condition information of a road segment on which the plurality of vehicle terminals are located is obtained.

In an embodiment of this disclosure, in a case that the cloud platform is a central cloud platform, the vehicle terminals may send the location information, the traveling status information, and the road condition information of the road section on which the vehicle terminals travel to the central cloud platform through a mobile communication network. In a case that the cloud platform is a road-side cloud platform, the vehicle terminals may send the location information, the traveling status information, and the road condition information of the road section on which the vehicle terminals travel to the road-side cloud platform through a mobile communication network or V2X communication.

The location information of the vehicle terminals may be sent to the cloud platform by the vehicle terminals or may be obtained by the cloud platform by intercommunicating with a high-precision positioning system and implementing high-precision positioning of the vehicle terminals by collaborating with the vehicle terminals. The traveling status information of the vehicle terminals includes speed information, acceleration information, and the like of the vehicle terminals. The road condition information of the road section on which the vehicle terminals travel includes a potential safety risk (for example, whether there is a landslide, whether there is a slippery road surface, whether there is a side wind, and whether there is a tunnel) on the road section on which the vehicle terminals travel or may include a vehicle condition (for example, whether there is a potential safety risk of another vehicle) on the road section.

In step S220, an FCW message is generated in response to detecting, according to the location information and the traveling status information of the plurality of vehicle terminals and the road condition information, that a specified vehicle terminal has a potential collision risk. In an example, an FCW message is generated in response to detecting that a specified vehicle terminal of the plurality of vehicle terminals has a potential collision risk, the potential collision risk being detected based on the location information of at least the specified vehicle terminal and the traveling status information of at least the specified vehicle terminal.

In an embodiment of this disclosure, for example, in response to detecting that a distance between a vehicle and a vehicle in front is short and the vehicle travels at a high speed, it may be determined that the vehicle has a potential collision risk. In another example, in response to detecting that there is a landslide in front of a vehicle and the vehicle travels at a high speed, it may be determined that the vehicle has a potential collision risk.

In step S230, a transmission mode of the FCW message is determined according to communication capabilities of vehicle terminals included in an FCW vehicle set corresponding to the specified vehicle terminal. In an example, a transmission mode of the FCW message is determined based on communication capabilities of the plurality of vehicle terminals included in an FCW vehicle set of the specified vehicle terminal.

In an embodiment of this disclosure, in a case that the vehicle terminals in the FCW vehicle set all support PC5 transmission and the vehicle terminals in the FCW vehicle set are in a communication coverage area of PC5, determine to transmit the FCW message to one or more vehicle terminals in the FCW vehicle set through PC5 communication, and transmit, by the one or more vehicle terminals, the FCW message to other vehicle terminals in the FCW vehicle set through PC5 communication.

In an embodiment of this disclosure, in a case that the vehicle terminals in the FCW vehicle set support PC5 transmission but PC5 transmission fails to meet a delay requirement, determine to transmit the FCW message to the vehicle terminals in the FCW vehicle set in a mobile communication mode and through PC5 communication or determine to transmit the FCW message to the vehicle terminals in the FCW vehicle set in a mobile communication mode. In response to predicting that a duration to be taken to transmit the FCW message through PC5 transmission is greater than a set value, it may be determined that PC5 transmission cannot meet a delay requirement; or in response to predicting that channel quality of a PC5 transmission channel is less than a set value, it may be determined that PC5 transmission cannot meet a delay requirement.

In an embodiment of this disclosure, in a case that the vehicle terminals in the FCW vehicle set all support mobile communication and the vehicle terminals in the FCW vehicle set are in a communication coverage area of a mobile communication network, determine to transmit the FCW message to the vehicle terminals in the FCW vehicle set in a mobile communication mode.

In an embodiment of this disclosure, in a case that a vehicle terminal that does not support PC5 transmission or does not support mobile communication exists in the vehicle terminals in the FCW vehicle set, determine to transmit the FCW message to the vehicle terminals in the FCW vehicle set in a mobile communication mode and through PC5 communication. Specifically, the FCW message may be transmitted in a mobile communication mode to a vehicle terminal that does not support PC5 transmission, and the FCW message is transmitted through PC5 transmission to a vehicle terminal that does not support a mobile communication mode.

In a case that a vehicle terminal supports mobile communication and PC5 communication, the FCW message may be transmitted to the vehicle terminal in a mobile communication mode, the FCW message may be transmitted to the vehicle terminal through PC5 communication, or the FCW message may be transmitted to the vehicle terminal simultaneously in a mobile communication mode and through PC5 communication.

In an embodiment of this disclosure, in response to determining that the FCW message needs to be sent to the vehicle terminal in a mobile communication mode, the cloud platform may send a resource allocation request to a mobile communication network side (for example, a core network side or an access network side), to obtain network slice information or a radio transmission resource that is allocated by the mobile communication network side and is used for transmitting an FCW message.

In step S240, the FCW message is transmitted to the vehicle terminals included in the FCW vehicle set in the determined transmission mode.

In an embodiment of this disclosure, a vehicle terminal without an ADAS FCW function in the FCW vehicle set may be determined according to ADAS capability information of the vehicle terminals included in the FCW vehicle set, and then the FCW message is preferentially transmitted to the vehicle terminal without an ADAS FCW function in the FCW vehicle set in the determined transmission mode. The technical solution in this embodiment can ensure that a vehicle terminal without an ADAS FCW function obtains an FCW message in time.

Figure 3:
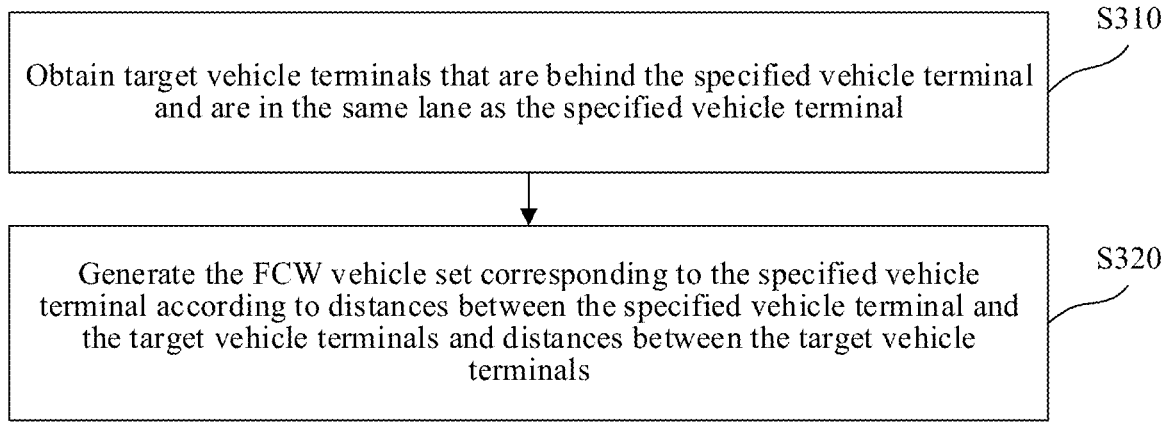
FIG. 3 is a flowchart of generating an FCW vehicle set according to an embodiment of this disclosure.

In an embodiment of this disclosure, the FCW vehicle set in the foregoing embodiments may be obtained through the technical solution in the embodiment shown in FIG. 3, which specifically includes the following steps:

In step S310, target vehicle terminals that are behind the specified vehicle terminal and are in the same lane as the specified vehicle terminal are obtained.

The target vehicle terminals that are behind the specified vehicle terminal and are in the same lane as the specified vehicle terminal may be obtained according to the location information of the vehicle terminals.

In step S320, the FCW vehicle set corresponding to the specified vehicle terminal is generated according to distances between the specified vehicle terminal and the target vehicle terminals and distances between the target vehicle terminals.

In an embodiment of this disclosure, a target vehicle terminal whose distance from the specified vehicle terminal is less than or equal to a set value may be added to a first set according to the distances between the specified vehicle terminal and the target vehicle terminals, then a target vehicle terminal whose distance from a vehicle terminal in the first set is less than or equal to the set value is added to the first set according to the distances between the target vehicle terminals, and finally the FCW vehicle set corresponding to the specified vehicle terminal is generated according to vehicle terminals in the first set.

Figure 4:
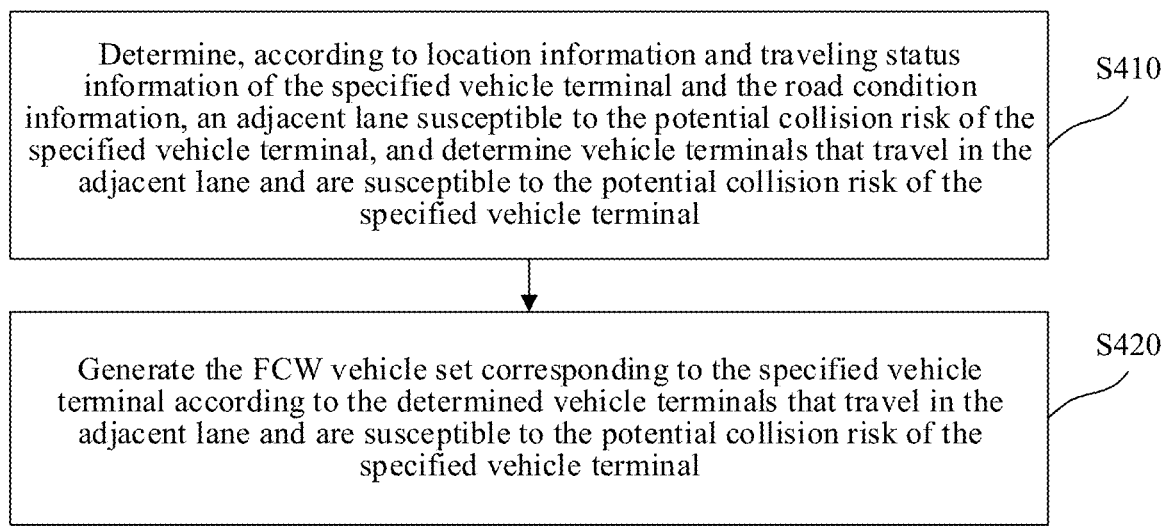
FIG. 4 is a flowchart of generating an FCW vehicle set according to an embodiment of this disclosure.

In an embodiment of this disclosure, the FCW vehicle set in the foregoing embodiments may be obtained through the technical solution in the embodiment shown in FIG. 4, which specifically includes the following steps:

In step S410, according to location information and traveling status information of the specified vehicle terminal and the road condition information, an adjacent lane susceptible to the potential collision risk of the specified vehicle terminal is determined, and vehicle terminals that travel in the adjacent lane and are susceptible to the potential collision risk of the specified vehicle terminal are determined.

In an embodiment of this disclosure, a vehicle terminal that travels in the adjacent lane and whose distance from the specified vehicle terminal is less than or equal to a set value may be added to a second set according to distances between the vehicle terminals that travel in the adjacent lane and the specified vehicle terminal, then a vehicle terminal that travels in the adjacent lane and whose distance from a vehicle terminal in the second set is less than or equal to the set value is added to the second set according to distances between the vehicle terminals that travel in the adjacent lane, and vehicle terminals in the second set are used as the vehicle terminals that travel in the adjacent lane and are susceptible to the potential collision risk of the specified vehicle terminal.

In step S420, the FCW vehicle set corresponding to the specified vehicle terminal is generated according to the determined vehicle terminals that travel in the adjacent lane and are susceptible to the potential collision risk of the specified vehicle terminal.

In an embodiment of this disclosure, the FCW vehicle set corresponding to the specified vehicle terminal may be generated jointly according to the technical solutions in the embodiments shown in FIG. 3 and FIG. 4. In the technical solutions in the embodiments shown in FIG. 3 and FIG. 4, the FCW vehicle set corresponding to the specified vehicle terminal may be dynamically updated according to the location information and the traveling status information of the plurality of vehicle terminals.

In summary, in embodiments of this disclosure, mainly a cloud platform (a central cloud platform or a road-side cloud platform) obtains location information and traveling status information of a specific vehicle, road condition information, and the like, and analyzes location information, speed information, and the like of vehicles near the specific vehicle to determine a safety risk of the vehicle, and send the safety risk to vehicles in a specific range through a mobile communication network (for example, a 5G network or a next-generation wireless communication system) or V2X. For example, in response to detecting that a vehicle performs emergency braking, a multiple-vehicle pile-up warning is sent to vehicles in a specific range behind the vehicle by using the 5G network technology. The specific range includes the same lane and an adjacent lane. Detailed description is provided below with reference to FIG. 5.

Figure 5:
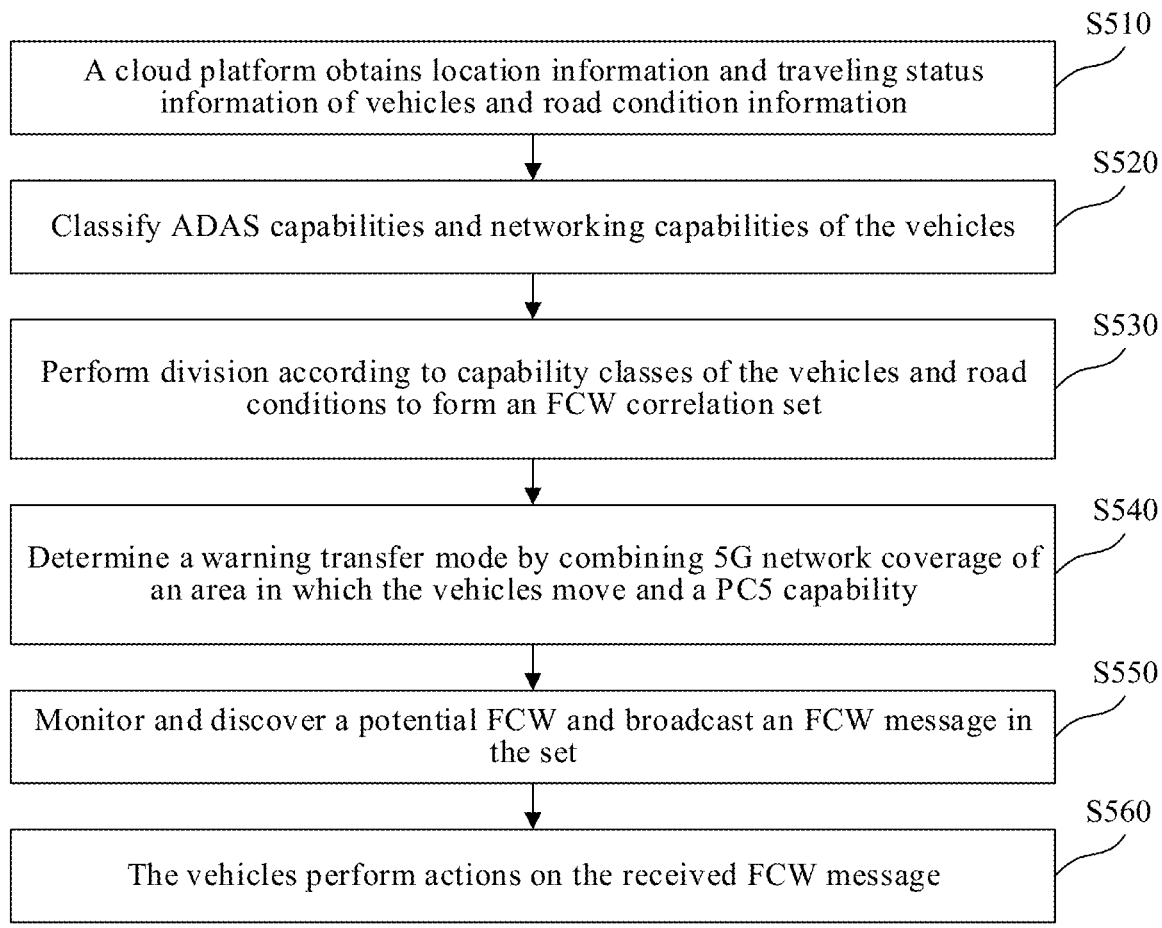
FIG. 5 is a flowchart of a driving assistance processing method according to an embodiment of this disclosure.

FIG. 5 is a flowchart of a driving assistance processing method according to an embodiment of this disclosure. The method may be performed by the electronic device shown in FIG. 7. Referring to FIG. 5, the driving assistance processing method includes at least steps S510 to S560, which are described below in detail:

In step S510, a cloud platform obtains location information and traveling status information of vehicles and road condition information.

In an embodiment of this disclosure, the cloud platform may be a central cloud platform or a road-side cloud platform. The central cloud platform provides large-area coverage through a mobile communication network (for example, a 5G network). The road-side cloud platform provides small-area coverage through a 5G small base station or a road-side unit (RSU) of V2X.

In step S520, ADAS capabilities and networking capabilities of the vehicles are classified.

In an embodiment of this disclosure, after classifying the ADAS capabilities and the networking capabilities of the vehicles, the cloud platform may obtain at least three types as follows:
type i: Uu networking+PC5 networking+ADAS FCW,
type ii: Uu networking+ADAS FCW, and
type iii: Uu networking.

The main objective of the foregoing classification is to comprehensively consider vehicles with different ADAS FCW capabilities and whether the vehicles have PC5 capabilities, thereby improving the pertinence of an ADAS enhancement algorithm. The specific principles may be as follows:

Vehicles with Uu networking, PC5 networking, and ADAS FCW have a FCW capability of a short-range sensing area. Therefore, when vehicles of this type approach vehicles without ADAS FCW or without PC5 networking, in the algorithm design, more precise algorithm control and more emergent reminder need to be provided to the vehicles without ADAS FCW or without PC5 networking.

A vehicle with Uu networking and ADAS FCW has a particular FCW capability within a short-range sensing area but cannot forward an FCW message in a PC5 mode, which may result in a failure in a PC5 forwarding chain. Therefore, an FCW message may be sent in a Uu mode.

In step S530, division is performed according to capability classes of the vehicles and road conditions to form an FCW correlation set.

In an embodiment of this disclosure, the FCW correlation set is an FCW vehicle set in the foregoing embodiments, and includes a series of vehicles. Among these vehicles, when one vehicle (for ease of description, the vehicle is denoted as a specified vehicle) performs emergency braking, tailgating may be directly or indirectly caused. Specifically, the vehicles in the FCW vehicle set may include rear vehicles on the same lane and rear vehicles on a different lane.

The rear vehicles on the same lane in the FCW correlation set include: a rear vehicle X1 with a dynamic vehicle distance from the specified vehicle being less than L1, a rear vehicle X2 with a dynamic vehicle distance from the rear vehicle X1 being less than L1, a rear vehicle X3 with a dynamic vehicle distance from the rear vehicle X2 being less than L1, and the like.

The rear vehicles on an adjacent lane in the FCW correlation set include: a vehicle Y1 that is on an adjacent lane (the adjacent lane is a lane that may be affected if the specified vehicle encounters tailgating) and has a dynamic vehicle distance from the specified vehicle being less than L2, a rear vehicle Y2 with a dynamic vehicle distance from the vehicle Y1 being less than L1, a rear vehicle Y3 with a dynamic vehicle distance from the rear vehicle Y2 being less than L1, and the like.

The vehicles in the FCW correlation set are dynamically updated. Once a vehicle performs emergency braking, the FCW message is sent to the vehicles in the FCW correlation set through a 5G network and/or in a C-V2X PC5 communication mode.

In step S540, a warning transfer mode is determined by combining 5G network coverage of an area in which the vehicles move and a PC5 capability.

In an embodiment of this disclosure, in a case that a vehicle has a PC5 capability and a PC5 communication range is sufficient, transmission may be performed through PC5. This mode is applicable to a scenario in which the vehicles in the FCW correlation set are relatively densely distributed and the transfer of an FCW message can be directly and efficiently implemented in a PC5 mode.

In an embodiment of this disclosure, in a case that some vehicles in the FCW correlation set do not have a PC5 capability or in a case that all vehicles have a PC5 capability but delays in PC5 transmission do not satisfy a requirement, an FCW message may be transmitted in a Uu mode. This mode is applicable to a scenario in which the vehicles in the FCW correlation set are distributed in a relatively large area and the efficient transfer cannot be implemented in a PC5 mode. For example, a plurality of vehicles in the FCW correlation set form a chain. However, a vehicle that does not support PC5 communication capabilities exists in the chain. As a result, an FCW message cannot be transmitted in time in a PC5 mode.

In step S550, a potential FCW is monitored and discovered, and an FCW message broadcast in the set.

In an embodiment of this disclosure, in a case that the cloud platform transmits an FCW message in a 5G Uu mode (or a Uu mode in a 4G or next-generation mobile communication system), a 5G network needs to allocate a dedicated network slice or radio resource for the transmission of an FCW message.

In a case that the cloud platform transmits an FCW message in a PC5 mode, the cloud platform may first transmit the FCW message to one or more vehicles, and simultaneously inform the one or more vehicles of information about an FCW correlation set (for example, a list of vehicles in an FCW set are directly provided or information about an FCW message release range such as a communication distance of 500 meters is provided), so that the one or more vehicles transmit the FCW message to the vehicles in the FCW correlation set in the PC5 mode.

In an embodiment of this disclosure, the cloud platform may simultaneously transmit an FCW message in parallel in a 5G Uu+PC5 mode. In this case, a 5G network needs to allocate a dedicated network slice or radio resource for the transmission of an FCW message.

In step S560, the vehicles perform actions on the received FCW message.

After receiving the FCW message, the vehicles may perform an action such as a deceleration or a pullover.

In a technical solution in the embodiments of this disclosure, a cloud platform may combine information from a plurality of vehicle terminals to determine whether a vehicle terminal has a potential collision risk, to resolve the problem of a limited sensing range of a single-vehicle ADAS, thereby effectively enhancing the safety of the ADAS.

The following describes apparatus embodiments of this disclosure, and the apparatus embodiments may be used for performing the driving assistance processing method in the foregoing embodiments of this disclosure. For details not disclosed in the apparatus embodiments of this disclosure, refer to the foregoing embodiments of the driving assistance processing method of this disclosure.

Figure 6:
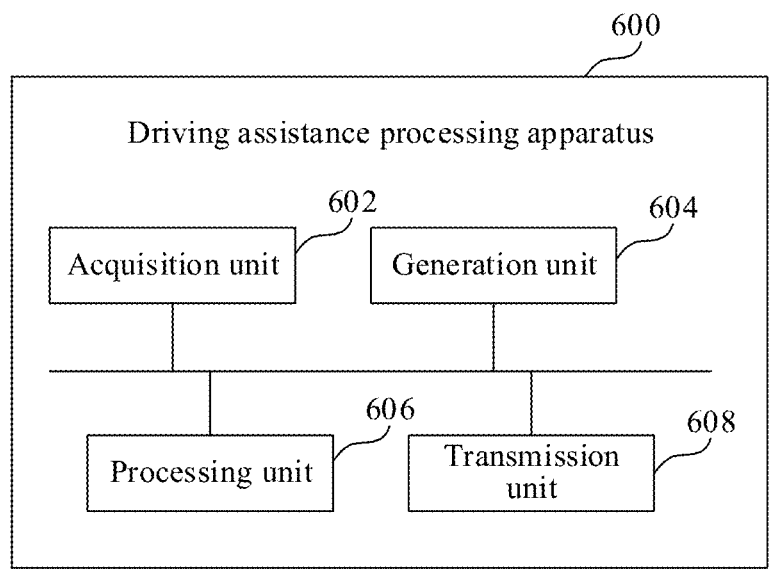
FIG. 6 is a block diagram of a driving assistance processing apparatus according to an embodiment of this disclosure.

FIG. 6 is a block diagram of a driving assistance processing apparatus according to an embodiment of this disclosure. The driving assistance processing apparatus may be disposed in a cloud platform. The cloud platform may be a central cloud platform or a road-side cloud platform.

Referring to FIG. 6, a driving assistance processing apparatus 600 according to an embodiment of this disclosure includes an obtaining unit 602, a generation unit 604, a processing unit 606, and a transmission unit 608. One or more modules, submodules, and/or units of the apparatus can be implemented by processing circuitry, software, or a combination thereof, for example.

The obtaining unit 602 is configured to obtain location information and traveling status information of a plurality of vehicle terminals and road condition information of a road section on which the plurality of vehicle terminals travel. The generation unit 604 is configured to generate an FCW message in response to detecting, according to the location information and the traveling status information of the plurality of vehicle terminals and the road condition information, that a specified vehicle terminal has a potential collision risk. The processing unit 606 is configured to determine a transmission mode of the FCW message according to communication capabilities of vehicle terminals included in an FCW vehicle set corresponding to the specified vehicle terminal. The transmission unit 608 is configured to transmit the FCW message to the vehicle terminals included in the FCW vehicle set in the determined transmission mode.

In some embodiments of this disclosure, based on the foregoing solution, the processing unit 606 is further configured to: obtain target vehicle terminals that are behind the specified vehicle terminal and are in the same lane as the specified vehicle terminal; and generate the FCW vehicle set corresponding to the specified vehicle terminal according to distances between the specified vehicle terminal and the target vehicle terminals and distances between the target vehicle terminals.

In some embodiments of this disclosure, based on the foregoing solution, the processing unit 606 is configured to: add, according to the distances between the specified vehicle terminal and the target vehicle terminals, a target vehicle terminal whose distance from the specified vehicle terminal is less than or equal to a set value to a first set; add, according to the distances between the target vehicle terminals, a target vehicle terminal whose distance from a vehicle terminal in the first set is less than or equal to the set value to the first set; and generate the FCW vehicle set corresponding to the specified vehicle terminal according to vehicle terminals in the first set.

In some embodiments of this disclosure, based on the foregoing solution, the processing unit 606 is further configured to: determine, according to location information and traveling status information of the specified vehicle terminal and the road condition information, an adjacent lane susceptible to the potential collision risk of the specified vehicle terminal, and determine vehicle terminals that travel in the adjacent lane and are susceptible to the potential collision risk of the specified vehicle terminal; and generate the FCW vehicle set corresponding to the specified vehicle terminal according to the determined vehicle terminals that travel in the adjacent lane and are susceptible to the potential collision risk of the specified vehicle terminal.

In some embodiments of this disclosure, based on the foregoing solution, the processing unit 606 is configured to: add, according to distances between the vehicle terminals that travel in the adjacent lane and the specified vehicle terminal, a vehicle terminal that travels in the adjacent lane and whose distance from the specified vehicle terminal is less than or equal to a set value to a second set; add, according to distances between the vehicle terminals that travel in the adjacent lane, a vehicle terminal that travels in the adjacent lane and whose distance from a vehicle terminal in the second set is less than or equal to the set value to the second set; and use vehicle terminals in the second set as the vehicle terminals that travel in the adjacent lane and are susceptible to the potential collision risk of the specified vehicle terminal.

In some embodiments of this disclosure, based on the foregoing solution, the processing unit 606 is further configured to: dynamically update the FCW vehicle set corresponding to the specified vehicle terminal according to the location information and the traveling status information of the plurality of vehicle terminals.

In some embodiments of this disclosure, based on the foregoing solution, the processing unit 606 is configured to: in a case that the vehicle terminals in the FCW vehicle set all support PC5 transmission and the vehicle terminals in the FCW vehicle set are in a communication coverage area of PC5, determine to transmit the FCW message to one or more vehicle terminals in the FCW vehicle set through PC5 communication, and transmit, by the one or more vehicle terminals, the FCW message to other vehicle terminals in the FCW vehicle set through PC5 communication.

In some embodiments of this disclosure, based on the foregoing solution, the processing unit 606 is configured to: in a case that the vehicle terminals in the FCW vehicle set support PC5 transmission but PC5 transmission fails to meet a delay requirement, determine to transmit the FCW message to the vehicle terminals in the FCW vehicle set in a mobile communication mode and through PC5 communication or determine to transmit the FCW message to the vehicle terminals in the FCW vehicle set in a mobile communication mode.

In some embodiments of this disclosure, based on the foregoing solution, the processing unit 606 is configured to: in a case that the vehicle terminals in the FCW vehicle set all support mobile communication and the vehicle terminals in the FCW vehicle set are in a communication coverage area of a mobile communication network, determine to transmit the FCW message to the vehicle terminals in the FCW vehicle set in a mobile communication mode.

In some embodiments of this disclosure, based on the foregoing solution, the processing unit 606 is configured to: in a case that a vehicle terminal that does not support PC5 transmission or does not support mobile communication exists in the vehicle terminals in the FCW vehicle set, determine to transmit the FCW message to the vehicle terminals in the FCW vehicle set in a mobile communication mode and through PC5 communication.

In some embodiments of this disclosure, based on the foregoing solution, the transmission unit 608 is further configured to send a resource allocation request to a mobile communication network side, to obtain network slice information or a radio transmission resource that is allocated by the mobile communication network side and is used for transmitting an FCW message.

In some embodiments of this disclosure, based on the foregoing solution, the transmission unit 608 is configured to: determine a vehicle terminal without an ADAS FCW function in the FCW vehicle set according to ADAS capability information of the vehicle terminals included in the FCW vehicle set; and preferentially transmit the FCW message to the vehicle terminal without an ADAS FCW function in the FCW vehicle set in the determined transmission mode.

In a technical solution provided in some embodiments of this disclosure, an FCW message is generated in response to detecting, according to location information and traveling status information of a plurality of vehicle terminals and road condition information, that a specified vehicle terminal has a potential collision risk, and a transmission mode of the FCW message is determined according to communication capabilities of vehicle terminals included in an FCW vehicle set corresponding to the specified vehicle terminal, to transmit the FCW message to the vehicle terminals included in the FCW vehicle set in the determined transmission mode, so that a cloud platform may combine information from a plurality of vehicle terminals to determine whether a vehicle terminal has a potential collision risk, to resolve the problem of a limited sensing range of a conventional single-vehicle ADAS, thereby effectively enhancing the safety of the ADAS.

Figure 7:
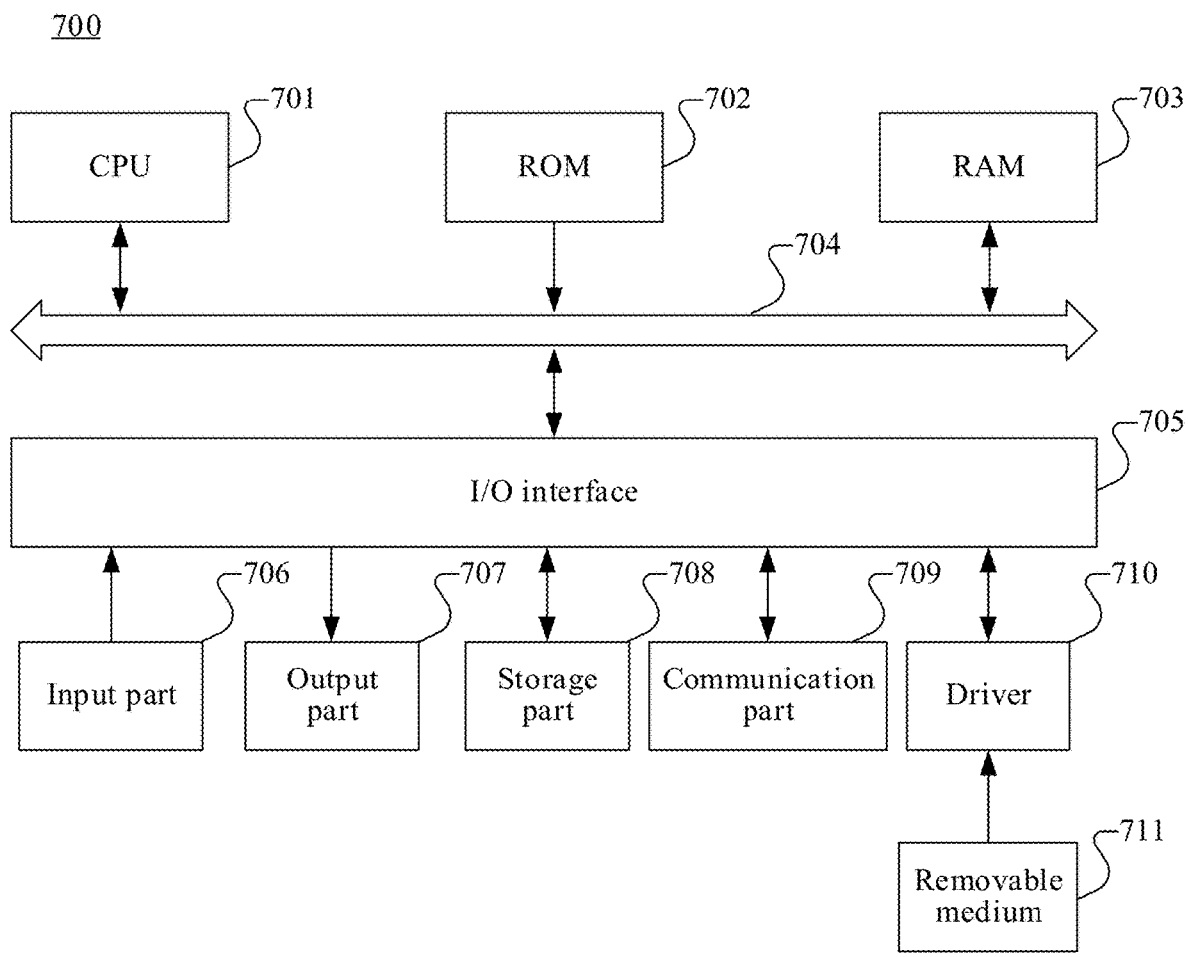
FIG. 7 is a schematic structural diagram of a computer system adapted to implement an electronic device according to an embodiment of this disclosure.

FIG. 7 is a schematic structural diagram of a computer system adapted to implement an electronic device according to an embodiment of this disclosure.

A computer system 700 of the electronic device shown in FIG. 7 is merely an example, and does not constitute any limitation on functions and use ranges of the embodiments of this disclosure.

As shown in FIG. 7, the computer system 700 includes processing circuitry, such as a central processing unit (CPU) 701, which may perform various suitable actions and processing based on a program stored in a read-only memory (ROM) 702 or a program loaded from a storage part 708 into a random access memory (RAM) 703, for example, perform the method described in the foregoing embodiments. The RAM 703 further stores various programs and data required for system operations. The CPU 701, the ROM 702, and the RAM 703 are connected to each other through a bus 704. An input/output (I/O) interface 705 is also connected to the bus 704.

The following components are connected to the I/O interface 705: an input part 706 including a keyboard, a mouse, or the like, an output part 707 including a cathode ray tube (CRT), a liquid crystal display (LCD), a speaker, or the like, a storage part 708 including a hard disk, or the like, and a communication part 709 including a network interface card such as a local area network (LAN) card or a modem. The communication part 709 performs communication processing by using a network such as the Internet. A driver 710 is also connected to the I/O interface 705 as required. A removable medium 711, such as a magnetic disk, an optical disc, a magneto-optical disk, or a semiconductor memory, is mounted on the driver 710 as required, so that a computer program read from the removable medium is installed into the storage part 708 as required.

According to an embodiment of this disclosure, the processes described in the foregoing by referring to the flowcharts may be implemented as computer software programs. For example, an embodiment of this disclosure includes a computer program product. The computer program product includes a computer program stored in a computer-readable medium. The computer program includes a computer program used for performing a method shown in the flowchart. In such an embodiment, the computer program may be downloaded and installed from a network through the communication part 709, and/or installed from the removable medium 711. When the computer program is executed by the CPU 701, the various functions defined in the system of this disclosure are executed.

The computer-readable medium shown in the embodiments of this disclosure may be a computer-readable signal medium or a computer-readable storage medium (such as a non-transitory computer-readable storage medium) or any combination thereof. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In this disclosure, the computer-readable storage medium may be any tangible medium including or storing a program, and the program may be used by or in combination with an instruction execution system, apparatus, or device. In this disclosure, the computer-readable signal medium may include a data signal transmitted in a baseband or as part of a carrier, and stores a computer-readable computer program. The propagated data signal may be in a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions, and operations that may be implemented by a system, a method, and a computer program product according to various embodiments of this disclosure. Each box in a flowchart or a block diagram may represent a module, a program segment, or a part of code. The module, the program segment, or the part of code includes one or more executable instructions used for implementing specified logic functions. In some implementations used as substitutes, functions marked in boxes may alternatively occur in a sequence different from that marked in an accompanying drawing. For example, two boxes shown in succession may actually be performed basically in parallel, and sometimes the two boxes may be performed in a reverse sequence. This is determined by a related function. Each block in the block diagram or the flowchart, and a combination of blocks in the block diagram or the flowchart may be implemented by using a dedicated hardware-based system that performs a specified function or operation, or may be implemented by using a combination of dedicated hardware and computer instructions.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Related units described in the embodiments of this disclosure may be implemented in a software manner, or may be implemented in a hardware manner, and the unit described can also be set in a processor. Names of these units do not constitute a limitation on the units in a case.

According to another aspect, this disclosure further provides a computer-readable medium. The computer-readable medium may be included in the electronic device described in the foregoing embodiments, or may exist alone and is not assembled in the electronic device. The computer-readable medium carries one or more programs, the one or more programs, when executed by the electronic device, causing the electronic device to implement the method described in the foregoing embodiments.

Although several modules or units of a device for action execution are mentioned in the foregoing detailed descriptions, the division is not mandatory. Actually, according to the implementations of this disclosure, the features and functions of two or more modules or units described above may be specified in one module or unit. Conversely, the features and functions of one module or unit described above may be further divided into a plurality of modules or units to be embodied.

Through the description of the foregoing embodiments, a person skilled in the art can understand that the exemplary implementations described herein may be implemented by software, or may be implemented by combining software with necessary hardware. Therefore, technical solutions of the embodiments of this disclosure may be implemented in a form of a software product. The software product may be stored in a non-volatile storage medium (which may be a CD-ROM, a USB flash drive, a removable hard disk, or the like) or on a network, including several instructions for instructing a computing device (which may be a PC, a server, a touch terminal, a network device, or the like) to perform the methods according to the embodiments of this disclosure.

After considering the specification and practicing the implementations of this disclosure, a person skilled in the art may conceive of other implementations of this disclosure. This disclosure is intended to cover any variation, use, or adaptive change of this disclosure. These variations, uses, or adaptive changes follow the general principles of this disclosure and are within the scope of this disclosure.

This disclosure is not limited to the precise structures described above and shown in the accompanying drawings, and various modifications and changes can be made without departing from the scope of this disclosure.

What is claimed is:

1. A driving assistance processing method, comprising:
    obtaining location information and traveling status information of a plurality of vehicle terminals;
    generating a forward collision warning (FCW) message in response to detecting that a specified vehicle terminal of the plurality of vehicle terminals has a potential collision risk, the potential collision risk being detected based on the location information of the specified vehicle terminal and the traveling status information of the specified vehicle terminal;
    generating an FCW vehicle set associated with the specified vehicle terminal, the FCW vehicle set including two or more target vehicle terminals of the plurality of vehicle terminals, the two or more target vehicle terminals including the specified vehicle terminal and at least one target vehicle terminal in an adjacent lane of the specified vehicle terminal, a distance between the specified vehicle terminal and each of the at least one target vehicle terminal in the adjacent lane being less than a set distance;
    determining a transmission mode of the FCW message based on communication capabilities of the two or more target vehicle terminals included in the FCW vehicle set of the specified vehicle terminal, wherein when the communication capability of a target vehicle terminal of the two or more target vehicle terminals in the FCW vehicle set indicates that the target vehicle terminal supports PC5 transmission and fails to meet a delay requirement, the transmission mode of the FCW message for the target vehicle terminal is determined as a combination of PC5 communication and a mobile communication mode; and
    transmitting the FCW message generated in response to detecting that the specified vehicle terminal has the potential collision risk to the two or more target vehicle terminals included in the FCW vehicle set according to the determined transmission mode.

2. The driving assistance processing method according to claim 1, further comprising:
    obtaining road condition information of a road segment on which the plurality of vehicle terminals are located,
    wherein the potential collision risk is detected according to the location information of the specified vehicle terminal, the traveling status information of the specified vehicle terminal, and the road condition information.

3. The driving assistance processing method according to claim 2, wherein
    the traveling status information includes speed information and acceleration information, and
    the road condition information indicates whether the road segment includes a potential driving hazard.

4. The driving assistance processing method according to claim 1, wherein:
    the two or more target vehicle terminals of the FCW vehicle set includes at least one target vehicle terminal that is behind the specified vehicle terminal and in a same lane as the specified vehicle terminal.

5. The driving assistance processing method according to claim 4, wherein the generating the FCW vehicle set comprises:
    adding a first target vehicle terminal of the two or more target vehicle terminals that is within the set distance from the specified vehicle terminal to a first set;
    adding a second target vehicle terminal of the two or more target vehicle terminals that is within the set distance from another one of the two or more target vehicle terminals to the first set; and
    generating the FCW vehicle set of the specified vehicle terminal based on the first set.

6. The driving assistance processing method according to claim 1, further comprising:
    determining, according to the location information and the traveling status information of the specified vehicle terminal, the adjacent lane susceptible to the potential collision risk of the specified vehicle terminal;

determining whether any of the plurality of vehicle terminals travels in the adjacent lane and is susceptible to the potential collision risk of the specified vehicle terminal; and generating the FCW vehicle set of the specified vehicle terminal based on the determination of whether any of the plurality of vehicle terminals travels in the adjacent lane and is susceptible to the potential collision risk of the specified vehicle terminal.

7. The driving assistance processing method according to claim 6, wherein the determining whether any of the plurality of vehicle terminals travels in the adjacent lane and is susceptible to the potential collision risk of the specified vehicle terminal comprises:

adding a first vehicle terminal of the plurality of vehicle terminals that travels in the adjacent lane and is within the set distance from the specified vehicle terminal to a second set;

adding a second vehicle terminal of the plurality of vehicle terminals that travels in the adjacent lane and is within the set distance from another one of the plurality of vehicle terminals to the second set; and determining one or more of the plurality of vehicle terminals that travel in the adjacent lane and are susceptible to the potential collision risk of the specified vehicle terminal based on the second set.

8. The driving assistance processing method according to claim 1, further comprising:

dynamically updating the FCW vehicle set of the specified vehicle terminal according to the location information and the traveling status information of the plurality of vehicle terminals.

9. The driving assistance processing method according to claim 1, wherein the determining the transmission mode of the FCW message comprises:

determining the transmission mode to transmit the FCW message to one or more target vehicle terminals in the FCW vehicle set as the PC5 communication when each of the two or more target vehicle terminals in the FCW vehicle set supports the PC5 transmission and is in a communication coverage area of the PC5 communication, the FCW message being transmitted to other target vehicle terminals in the FCW vehicle set through the PC5 communication.

10. The driving assistance processing method according to claim 1, wherein the determining the transmission mode of the FCW message comprises:

determining the transmission mode to transmit the FCW message to the two or more target vehicle terminals in the FCW vehicle set as the combination of the mobile communication mode and the PC5 communication when the two or more target vehicle terminals in the FCW vehicle set support the PC5 transmission and fail to meet the delay requirement.

11. The driving assistance processing method according to claim 1, wherein the determining the transmission mode of the FCW message comprises:

determining the transmission mode to transmit the FCW message to the two or more target vehicle terminals in the FCW vehicle set as the mobile communication mode when each of the two or more target vehicle terminals in the FCW vehicle set supports the mobile communication mode and is in a communication coverage area of a mobile communication network.

12. The driving assistance processing method according to claim 1, wherein the determining the transmission mode of the FCW message comprises:

determining the transmission mode to transmit the FCW message to the two or more target vehicle terminals in the FCW vehicle set as the mobile communication mode and the PC5 communication when one of the two or more target vehicle terminals included in the FCW vehicle set does not support one of the PC5 transmission and the mobile communication.

13. The driving assistance processing method according claim 10, further comprising:

sending a resource allocation request to a mobile communication network side, to obtain network slice information or a radio transmission resource that is allocated by the mobile communication network side to transmission of the FCW message.

14. The driving assistance processing method according to claim 1, wherein the transmitting the FCW message comprises:

determining a target vehicle terminal without an advanced driving assistance system (ADAS) FCW function in the FCW vehicle set according to ADAS capability information of the two or more target vehicle terminals in the FCW vehicle set; and transmitting the FCW message to the target vehicle terminal without the ADAS FCW function in the FCW vehicle set according to the determined transmission mode.

15. A driving assistance processing apparatus, comprising:

processing circuitry configured to:

obtain location information and traveling status information of a plurality of vehicle terminals;

generate a forward collision warning (FCW) message in response to detecting that a specified vehicle terminal of the plurality of vehicle terminals has a potential collision risk, the potential collision risk being detected based on the location information of the specified vehicle terminal and the traveling status information of the specified vehicle terminal;

generate an FCW vehicle set associated with the specified vehicle terminal, the FCW vehicle set including two or more target vehicle terminals of the plurality of vehicle terminals, the two or more target vehicle terminals including the specified vehicle terminal and at least one target vehicle terminal in an adjacent lane of the specified vehicle terminal, a distance between the specified vehicle terminal and each of the at least one target vehicle terminal in the adjacent lane being less than a set distance;

determine a transmission mode of the FCW message based on communication capabilities of the two or more target vehicle terminals included in the FCW vehicle set of the specified vehicle terminal, wherein when the communication capability of a target vehicle terminal of the two or more target vehicle terminals in the FCW vehicle set indicates that the target vehicle terminal supports PC5 transmission and fails to meet a delay requirement, the transmission mode of the FCW message for the target vehicle terminal is determined as a combination of PC5 communication and a mobile communication mode; and transmit the FCW message generated in response to detecting that the specified vehicle terminal has the potential collision risk to the two or more target vehicle terminals included in the FCW vehicle set according to the determined transmission mode.

16. The driving assistance processing apparatus according to claim 15, wherein:
the processing circuitry is configured to obtain road condition information of a road segment on which the plurality of vehicle terminals is located, and
the potential collision risk is detected according to the location information of the specified vehicle terminal, the traveling status information of the specified vehicle terminal, and the road condition information.

17. The driving assistance processing apparatus according to claim 15, wherein:
the two or more target vehicle terminals of the FCW vehicle set includes at least one target vehicle terminal that is behind the specified vehicle terminal and in a same lane as the specified vehicle terminal.

18. The driving assistance processing apparatus according to claim 17, wherein the processing circuitry is configured to:
add a first target vehicle terminal of the two or more target vehicle terminals that is within the set distance from the specified vehicle terminal to a first set;
add a second target vehicle terminal of the two or more target vehicle terminals that is within the set distance from another one of the two or more target vehicle terminals to the first set; and
generate the FCW vehicle set of the specified vehicle terminal based on the first set.

19. The driving assistance processing apparatus according to claim 15, wherein the processing circuitry is configured to:
determine, according to the location information and the traveling status information of the specified vehicle terminal, the adjacent lane susceptible to the potential collision risk of the specified vehicle terminal;
determine whether any of the plurality of vehicle terminals travels in the adjacent lane and is susceptible to the potential collision risk of the specified vehicle terminal; and
generate the FCW vehicle set of the specified vehicle terminal based on the determination of whether any of the plurality of vehicle terminals travels in the adjacent lane and is susceptible to the potential collision risk of the specified vehicle terminal.

20. A non-transitory computer-readable storage medium, storing instructions which when executed by a processor cause the processor to perform:
obtaining location information and traveling status information of a plurality of vehicle terminals;
generating a forward collision warning (FCW) message in response to detecting that a specified vehicle terminal of the plurality of vehicle terminals has a potential collision risk, the potential collision risk being detected based on the location information of the specified vehicle terminal and the traveling status information of the specified vehicle terminal;
generating an FCW vehicle set associated with the specified vehicle terminal, the FCW vehicle set including two or more target vehicle terminals of the plurality of vehicle terminals, the two or more target vehicle terminals including the specified vehicle terminal and at least one target vehicle terminal in an adjacent lane of the specified vehicle terminal, a distance between the specified vehicle terminal and each of the at least one target vehicle terminal in the adjacent lane being less than a set distance;
determining a transmission mode of the FCW message based on communication capabilities of the two or more target vehicle terminals included in the FCW vehicle set of the specified vehicle terminal, wherein when the communication capability of a target vehicle terminal of the two or more target vehicle terminals in the FCW vehicle set indicates that the target vehicle terminal supports PC5 transmission and fails to meet a delay requirement, the transmission mode of the FCW message for the target vehicle terminal is determined as a combination of PC5 communication and a mobile communication mode; and
transmitting the FCW message generated in response to detecting that the specified vehicle terminal has the potential collision risk to the two or more target vehicle terminals included in the FCW vehicle set according to the determined transmission mode.

\* \* \* \* \*